(12) United States Patent
Nicholson et al.

(10) Patent No.: US 7,881,620 B2
(45) Date of Patent: Feb. 1, 2011

(54) STABILIZED OPTICAL FIBER CONTINUUM FREQUENCY COMBS USING POST-PROCESSED HIGHLY NONLINEAR FIBERS

(75) Inventors: Jeffrey W. Nicholson, Chatham, NJ (US); Paul S. Westbrook, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 923 days.

(21) Appl. No.: 11/417,093

(22) Filed: May 3, 2006

(65) Prior Publication Data

US 2006/0251424 A1    Nov. 9, 2006

Related U.S. Application Data

(60) Provisional application No. 60/677,700, filed on May 4, 2005.

(51) Int. Cl.
    *H04B 10/04*    (2006.01)
(52) U.S. Cl. .................. 398/189; 398/190; 398/191; 398/141; 398/157
(58) Field of Classification Search .......... 398/141, 398/142, 149, 87, 84, 189, 190, 191, 147; 385/122
    See application file for complete search history.

(56) References Cited

U.S. PATENT DOCUMENTS

| | | | |
|---|---|---|---|
| 6,121,826 A | 9/2000 | Dosho et al. | |
| 6,201,638 B1 | 3/2001 | Hall et al. | |
| 6,414,772 B2 | 7/2002 | Miyazaki | |
| 6,671,466 B1 | 12/2003 | Banerjee et al. | |
| 6,724,788 B1 | 4/2004 | Holzwarth et al. | |
| 6,785,303 B1 | 8/2004 | Holzwarth et al. | |
| 6,788,862 B2 | 9/2004 | Aitken et al. | |
| 6,813,448 B1 | 11/2004 | Chiappetta | |
| 6,850,543 B2 | 2/2005 | Cundiff et al. | |
| 6,897,959 B2 | 5/2005 | Haensch et al. | |
| 7,038,840 B1* | 5/2006 | Yam | 359/334 |
| 7,139,478 B2* | 11/2006 | Eggleton et al. | 398/29 |
| 7,171,089 B2* | 1/2007 | Feder et al. | 385/122 |
| 2002/0150363 A1* | 10/2002 | Bonfrate et al. | 385/122 |

(Continued)

OTHER PUBLICATIONS

Abeeluck, C. Headley, © 2003 A fiber-based, high-power super continuum light source A.K.*

(Continued)

*Primary Examiner*—Ken N Vanderpuye
*Assistant Examiner*—Hibret A Woldekidan
(74) *Attorney, Agent, or Firm*—Wendy W. Koba

(57) ABSTRACT

An arrangement for generating beat notes with a relatively high signal-to-noise ratio (SNR) utilizes a pulsed laser source coupled into a section of post-processed highly-nonlinear optical fiber (HNLF) to generate a frequency comb having one or more regions of enhanced spectral power. A second laser signal source is overlapped with the frequency comb to form one or more "beat notes" at difference frequencies(y) between the second source and the continuum comb. By virtue of the post-processing, areas of spectral enhancement are formed along the comb, and are positioned to interact with the second laser signal to generate optical beat notes. The second laser signal may be from an external source (forming beat notes from a signal "outside" of the comb), or may be a frequency-multiplied version of the generated supercontinuum (forming beat notes from a signal "within" the comb).

22 Claims, 7 Drawing Sheets

U.S. PATENT DOCUMENTS

| | | | |
|---|---|---|---|
| 2002/0171835 | A1 | 11/2002 | Haensch et al. |
| 2003/0091097 | A1 | 5/2003 | Yap et al. |
| 2004/0017833 | A1 | 1/2004 | Cundiff et al. |
| 2004/0066807 | A1 | 4/2004 | Kasazumi et al. |
| 2004/0175174 | A1* | 9/2004 | Suhami ............... 398/43 |
| 2004/0190907 | A1 | 9/2004 | Litvin |
| 2004/0208622 | A1* | 10/2004 | Grosz et al. ............ 398/160 |
| 2004/0213302 | A1* | 10/2004 | Fermann et al. ............ 372/6 |
| 2004/0258352 | A1* | 12/2004 | Takeyama et al. ............ 385/27 |
| 2004/0264977 | A1 | 12/2004 | Yap et al. |
| 2005/0018276 | A1 | 1/2005 | Kourogi et al. |
| 2005/0018724 | A1 | 1/2005 | Da Silva et al. |

OTHER PUBLICATIONS

Kim, K. Houberg, Li Diddams, S.A.; "Stable Femtosecond Optical Frequency Comb at 1.3 μm using Spectrally tailored Continuum From a Nonlinear fiber grating", Applied Physics Letter 85, 4600 (2004).

Hartl, I; Imeshev, G; Fermann, M.E.; Langrock, C.; Fejer, M.M.; "Integrated Self-Referenced Frequency-Comb Laser Based on a Combination of Fiber and Waveguide Technology"; Optics Express 6490; Aug. 22, 2005, vol. 13, No. 17.

Blumenthal, Daniel; "Distributed Raman Amplification for Ultra-High-Speed Cross-Phase-Modulation Wavelength Converters"; Project Report 2001-02 for Micro Project 01-005.

Westbrook, Paul S.; Nicholson, Jeffrey W.; Feder, Kenneth S.; Vabloiu, Andrew D.; "Improved Supercontinuum Generation Through UV Processing of Highly Non-Linear Fibers" Journal of Lightwave Techology, vol. 23, No. 1, Jan. 2005.

* cited by examiner f - f_b (MHz)

STABILIZED OPTICAL FIBER CONTINUUM FREQUENCY COMBS USING POST-PROCESSED HIGHLY NONLINEAR FIBERS

CROSS-REFERENCE TO RELATED APPLICATION

This application claims priority from Provisional Application No. 60/677,700, filed May 4, 2005.

TECHNICAL FIELD

The present invention relates to a stabilized optical fiber-based frequency comb source and, more particularly, to modifying a section of highly-nonlinear fiber (HNLF) through a post-fabrication process to improve the signal-to-noise ratio of a frequency comb produced in the HNLF.

BACKGROUND OF THE INVENTION

There are applications in the fiber optics field in which a low noise, broadband light source (supercontinuum) is of particular interest. For example, efforts are now being made toward spectral slicing wherein a common light source is used to generate a multitude of wavelength division multiplexed (WDM) signals. Such an application thus has the potential for replacing many lasers with a single light source. Other applications include, but are not limited to, frequency metrology, device characterization, dispersion measurements made on specialty fibers, and the determination of transmission characteristics of gratings. All of these various diagnostic tools may be greatly enhanced by the availability of such a broadband source.

In general, supercontinuum generation involves the launching of relatively high power laser light (typically, pulsed light) into an optical fiber, waveguide or other microstructure, wherein the laser pulse train undergoes significant spectral broadening due to nonlinear interactions in the fiber. Current efforts at supercontinuum generation, typically performed using light pulses having durations on the order of picoseconds ($10^{-12}$ sec) in kilometer lengths of fiber, have unfortunately shown degradation of coherence in the generating process. In particular, additional noise has been found to be introduced into the system during the spectral broadening aspect of the process.

A relatively new type of germanium-doped silica fiber with low dispersion slope and a small effective area, referred to hereinafter as "highly nonlinear fiber", or HNLF, has recently been developed. Although the nonlinear coefficients of HNLF are still smaller than those obtained with small core microstructured fibers, the coefficients are several times greater than those of standard transmission fibers, due to the small effective area of HNLF. Supercontinuum generation using an HNLF and a femtosecond fiber laser has been reported from various sources. In particular, U.S. Pat. No. 6,775,447 issued to J. W. Nicholson et al. on Aug. 10, 2004 discloses an HNLF supercontinuum source formed from a number of separate sections of HNLF fiber that have been fused together, each having a different dispersion value at the light source wavelength and an effective area between five and fifteen square microns.

Supercontinuum light of wavelengths spanning more than one octave have been generated in microstructured and tapered optical fibers by launching light pulses having durations on the order of femtoseconds ($10^{-15}$ sec) into the ends of such microstructured or tapered fibers. The extreme spectra thus produced are useful, for example, in measuring and stabilizing pulse-to-pulse carrier envelope phase, as well as in high-precision optical frequency combs. Efforts at modeling the continuum in microstructured fibers based on a modified nonlinear Schrodinger equation have been aimed at understanding the fundamental processes involved in the spectrum generation, and show that coherence is better maintained as the launched pulses are shortened in duration from the order of picoseconds to femtoseconds.

In the provision of optical frequency combs from supercontinuum sources, there are a number of applications that require a significant degree of stability for the individual frequency components that make up the comb. For example, stable combs can be used as stable oscillators and frequency comparators, as well as provide the basis for ultra-precise optical clocks. The stabilization process requires generating various RF beat notes by beating the comb against part of itself and/or against other light sources. The signal-to-noise ratio (SNR) of these beat notes depends on the power and noise properties of the continuum. For example, when a continuum is generated with picoseconds pulses in kilometer lengths of fiber, there is substantially more phase noise in the continuum than when the continuum is generated in very short lengths of fiber (i.e., less than one meter), and with femtosecond pulses. In the past, the noise of beat notes has been improved by, for example, reducing the laser noise, adjusting the fiber's dispersion and nonlinearity, or improving the RF electronics used to measure and stabilize the beat notes.

Thus, improving the SNR in a comb stabilization arrangement is considered a significant pursuit, since it will have a direct, immediate impact on the stability and robustness of stabilized optical fiber frequency combs.

SUMMARY OF THE INVENTION

The need remaining in the prior art is addressed by the present invention, which relates to a stabilized optical fiber-based frequency comb source and, more particularly, to modifying a section of highly-nonlinear fiber (HNLF) through a post-fabrication process to improve the signal-to-noise ratio of a frequency comb produced in the HNLF.

In accordance with the present invention, a post-processing technique is used to improve the SNR of selected spectral regions within an optical fiber continuum frequency comb formed from a section of HNLF. It has been discovered that the coherence properties of an optical frequency comb are maintained within the enhanced supercontinuum generation region formed from post-processing. By maintaining the coherence (phase noise) of the continuum within the enhancement, amplification of heterodyne beat note signals associated with an additional signal source provides significantly improved SNR (by a factor of 10 or more).

A preferred post-processing technique is the formation of a Bragg grating within the continuum-generating highly-nonlinear fiber, the grating generating strong spectral enhancements in a narrow bandwidth near the grating resonance. Other types of post processing include, but are not limited to, uniform (DC) or slowly-varying irradiation of the core region of the HNLF with ultraviolet (UV) light (or other suitable radiation source) that changes the refractive index profile of the fiber, the release of "frozen-in" strain near the fiber core, the application of large DC electric fields, and/or thermal treatments to the HNLF at one or more predetermined temperatures.

An external CW laser source may be used, in one embodiment, to provide the laser line source required to generate the beat notes from the frequencies in the comb. Alternatively, a frequency multiplier may be used in association with the generated frequency comb to provide a signal for generating one or more beat frequencies from "within" the comb. Additionally, the desired beat note may be generated by combining either of these generated beat notes between optical frequencies with one or more electrical signals, typically in the RF domain.

In one embodiment of the present invention, a plurality of separate post-processed areas may be disposed along the length of the HNLF to provide for improved signal-to-noise ratio (SNR) in a carrier-envelope stabilization scheme. A feedback signal path may be added between the output of the detector providing the beat note output and a pulsed laser source to further stabilize the arrangement.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
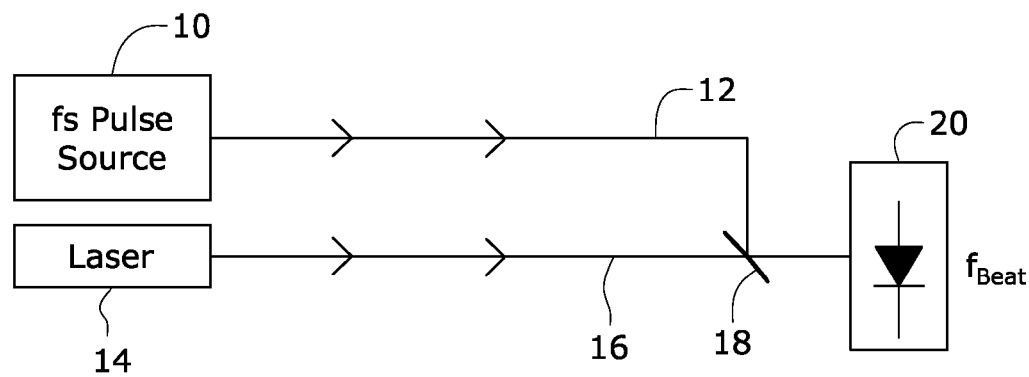
FIG. 1 illustrates an exemplary prior art arrangement for generating an optical frequency comb and associated beat note using a section of high-nonlinear optical fiber (HNLF)

In the past several years, the technological maturity of ultrafast lasers, as well as supercontinuum generation in highly-nonlinear optical fibers (HNLFs), has revolutionized optical frequency metrology. Highly-nonlinear optical fiber, as mentioned above, may be defined by its relatively large core dopant concentration and overall small core diameter, providing a nonlinear coefficient more than three times greater than that of standard dispersion-shifted fiber. Moreover, the Raman gain from a section of HNLF is generally more than twice as high as the gain realizable with a conventional fiber (indeed, a value of 2.5 times that of a conventional fiber can be expected). In the area of optical frequency metrology, stabilized frequency combs have enabled the straightforward measurement of optical frequencies with unprecedented precision, as well as enabled the implementation of atomic clocks based on optical standards. One aspect of the frequency stabilization of a frequency comb is self-referencing, which may use an octave-spanning continuum from an HNLF to detect and stabilize the carrier-envelope offset frequency $f_0$ of the continuum. Another aspect of frequency stabilization for such a comb involves heterodyning specific modes of the comb with defined optical reference frequencies to create "beat frequencies", or beat notes. In general, beat notes are generated in the electrical domain when two optical fields coincide within a detector. For the case of a standard square law detector that is linear in power (Vout=E×E*), the output beat notes will result from the product of the two E fields: E1×E2*. Therefore, the output voltage will contain both the sum and difference of all of the frequency components of E1 and E2. For optical fields, the sum frequencies are usually so large that they cannot be detected by conventional detection arrangements. Thus, the only signals that are subsequently "detected" are the difference frequencies. These "difference frequencies" are defined as the "beat notes", where the detector is said to "mix" the frequencies, and the detector is commonly referred to as a "mixer". At times, the measurement of this "difference" beat note is referred to as a heterodyne measurement. While the term "beat note" is specifically used in the electrical (RF) domain to represent the sum/difference frequencies of two signals, an "optical beat note", as implied here, may be thought of as representing the interference between two optical frequencies (that is, the overlap between the electrical fields oscillating at two different frequencies).

It can be presumed that in generating beat notes, a continuum comb can be defined as an E field comprising a plurality of (nominally) equally-spaced and well-defined frequency components. A "beat note" is generated when one or more of these frequency components are combined within a detector with another E field of well-defined frequencies (or a single frequency). As mentioned above, the beat note is defined as the difference frequency (or frequencies) between the one or more well-defined frequencies that fall on the detector. The E field signal used in this arrangement can be provided by the comb itself, typically from a portion of the comb that has been subjected to frequency conversion, such as doubling or tripling (referred to as "from the comb" types of beat note generation). Alternatively, the other E field may be provided from a separate signal source ("outside the comb"), typically a stabilized laser oscillator. Additionally, any beat note between two optical frequencies can also generate a beat note with another frequency, typically in the RF region.

The signal-to-noise ratio (SNR) of the created beat notes depends on the power and noise properties of the continuum. While some design elements of nonlinear fibers provide coarse selection of the generated continuum, generally speaking there is very little control over the output spectrum. Moreover, the spectrum is rarely uniform, but rather contains spectral regions with very little light. The arrangement of the present invention addresses these drawbacks by providing a spectrally enhanced continuum that results in the ability to generate beat notes with a significantly improved SNR.

FIG. 1 illustrates an exemplary prior art arrangement for generating an optical frequency comb using a section of HNLF. In this case, a femtosecond pulse laser source 10 is used to inject a train of pulses onto a section 12 of HNLF, as shown. The propagation of such femtosecond pulses along a section of HNLF is known to create an optical continuum output spectrum. A separate CW laser source 14 is used to create a single frequency optical signal that will "beat" against the frequencies of the generated comb and produce a "beat" note. The CW signal propagates along a separate section 16 of optical fiber (or, alternatively, as a free space optical signal), and is thereafter combined with the continuum signal in an optical combiner 18. An optical detector 20 is then used to measure the beat note produced by the CW signal with the frequency comb.

Figure 2:
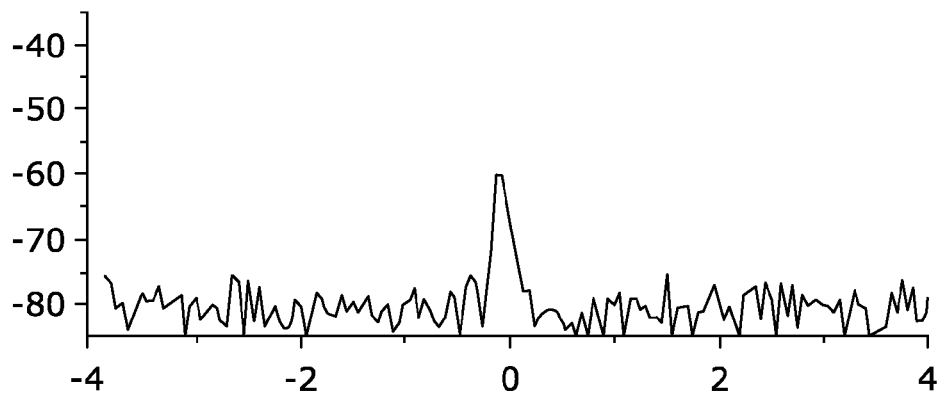
FIG. 2 contains a graph showing the generation of a "beat note" in an arrangement similar to that of FIG. 1.

In one example of this prior art arrangement, a 1.2-nJ, 35-fs pulse source, centered at 1.26 μm, was used as pulse source 10. The pulses were injected into a two meter section of dispersion-flattened HNLF 12. A CW laser operating at a wavelength of 657 nm was used as the combining signal. The generated beat note for a similar arrangement (in this case, including a frequency doubling element along HNLF 12) is illustrated in the graph of FIG. 2. As shown, this beat note exhibits a SNR on the order of 20 dB at 30 kHz resolution bandwidth (RBW). The intent of the present invention is to improve this SNR value.

Figure 3:
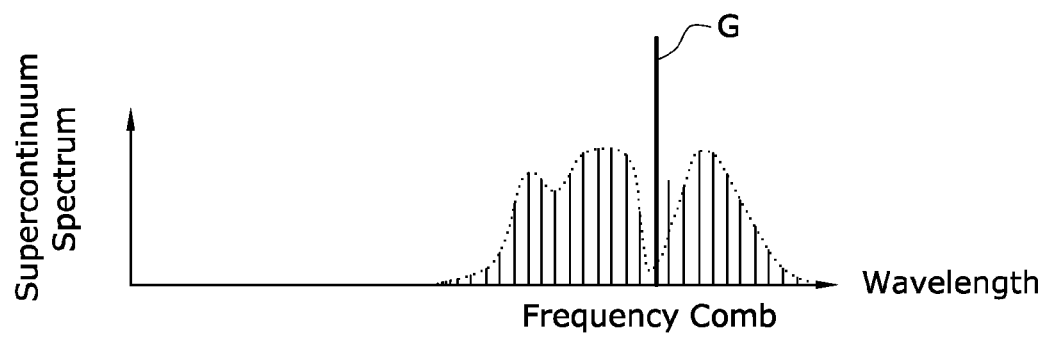
FIG. 3 is a plot of an enhanced continuum, illustrating a "peak" feature, using a post-processed section of HNLF.
Figure 4:
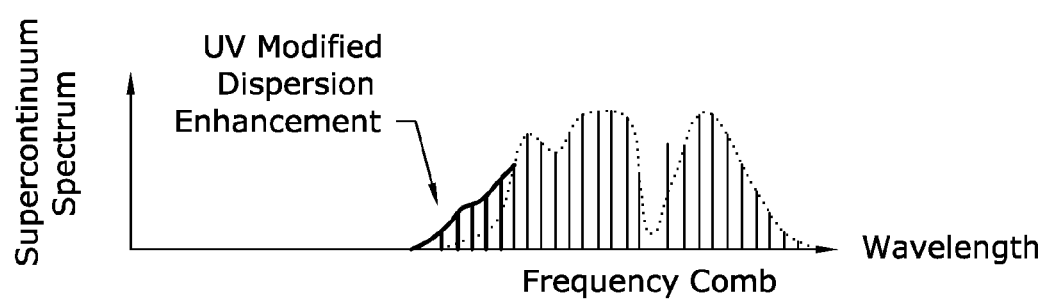
FIG. 4 is a plot of the enhanced continuum for a UV-exposed, post-processed section of HNLF.

It has been demonstrated in our prior, co-pending application Ser. Nos. 11/063,406 and 11/063,380 (filed Feb. 22, 2005) that "post processing" a section of HNLF will increase the bandwidth of a fiber continuum comb. As defined therein, the term "post processing" is considered to include, but not be limited to, UV exposure, electromagnetic field treatment, mechanically-induced fiber strain, thermal processes, and the like, all of which have been found to modifying the dispersion characteristics of HNLF in a manner that results in enhancing its generated continuum. Further, a narrow range of frequencies within a fiber frequency comb can be greatly enhanced by using post-processing in the form of adding a grating to the HNLF structure. FIG. 3 is a plot of an enhanced continuum illustrating an enhanced "peak" feature, denoted G, that has been introduced into the frequency comb spectrum by virtue of writing a grating (as a post processing fabrication step) into a section of HNLF used to form the frequency comb. As discussed in our above-cited co-pending applications, the grating characteristics (period, pitch, etc.) can be controlled to determine the location of one or more peaks in the continuum. In general, an enhancement from a Bragg grating will be confined to a wavelength bandwidth equal to a relatively small multiple of the bandwidth over which the grating has low transmission as a result of Bragg back reflection. This bandwidth over which Bragg reflection occurs is defined as the "grating bandwidth", will be confined to a wavelength bandwidth equal to a relatively small multiple of the bandwidth over which the grating has low transmission, as a result of the strong Bragg back reflection. This grating-enhanced bandwidth is defined as the "grating bandwidth", or "grating photonic bandgap" and provides a fundamental wavelength scale for measuring the effect of the Bragg grating on the continuum spectrum. The grating enhancement can be recognized by examining the continuum spectrum a predetermined distance away and comparing this spectrum to the spectral peak (or peaks) near the grating. For a typical grating enhancement, the peaks near the grating will be at least twice as large as the continuum a predetermined number (for example, 5) of bandwidths away. It should be noted that grating enhancement will typically be of interest when applied to enhance the spectrum near a minimum of the continuum. While FIG. 3 illustrates a grating enhancement that is relatively large compared to the entire continuum spectrum, this need not be the case to create an enhanced beat note. In this case, the spectral peak near the Bragg resonances may be large compared to the surrounding continuum, while still being less than the maximum value of the continuum spectrum, which may occur many nanometers of bandwidth away from the Bragg wavelength. As an alternative to writing a grating in a section of HNLF, an additional UV exposure (or thermal process, mechanical, and the like) can be used as a post-processing technique to yield an "enhancement" in a specific wavelength range on the frequency comb spectrum, as illustrated in FIG. 4.

Figure 5:
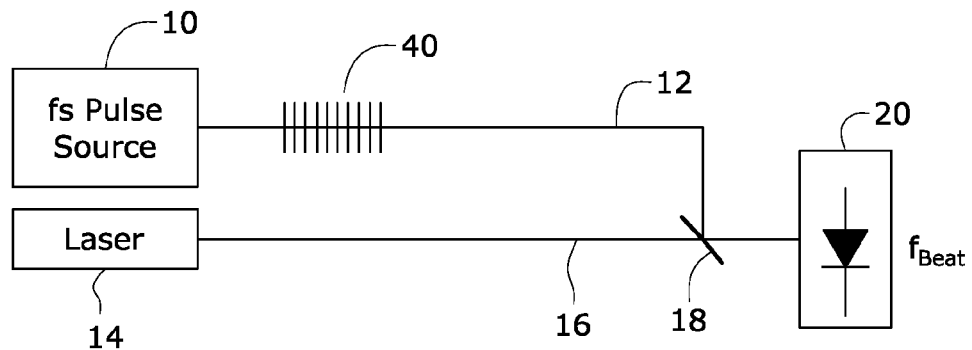
FIG. 5 is a block diagram of an exemplary enhanced continuum frequency comb generator formed in accordance with the present invention.
Figure 6:
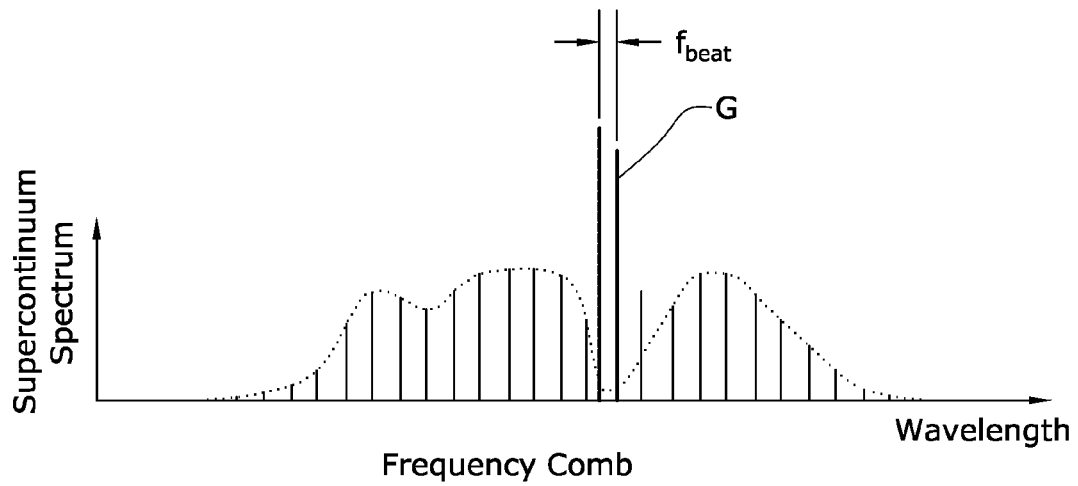
FIG. 6 is a graph of the model spectrum associated with the arrangement of FIG. 5.

In accordance with the teachings of the present invention, beat notes generated within a frequency comb formed using a section of supercontinuum HNLF are enhanced in power by performing post processing of the HNLF to modify its dispersion, nonlinearity and effective area characteristics. In one embodiment as illustrated in FIG. 5, a supercontinuum is generated using fs-pulse laser source 10, where the generated pulses are injected into highly-nonlinear optical fiber 12 (HNLF). In accordance with the present invention, HNLF 12 has been "post processed" to include a Bragg grating 40 (the Bragg grating serving as a resonant structure with periodic modulations of the core refractive index). Separate laser source 14 is used to generate a single frequency laser line that is injected along optical fiber section 16 and combined with the frequency comb output from HNLF 12 within combiner 18, so as to generate a beat frequency, denoted $f_{beat}$. FIG. 6 is a graph of the spectrum associated with the arrangement of FIG. 5, illustrating the frequency comb, grating feature G, the CW laser line output from source 14 and beat frequency $f_{beat}$. The ability to generate such a stable (i.e., "enhanced") beat frequency allows for the arrangement of the present invention to be utilized in various arrangements where frequency stabilization is a concern, such as the provision of clock signals in optical communication systems.

Figure 7:
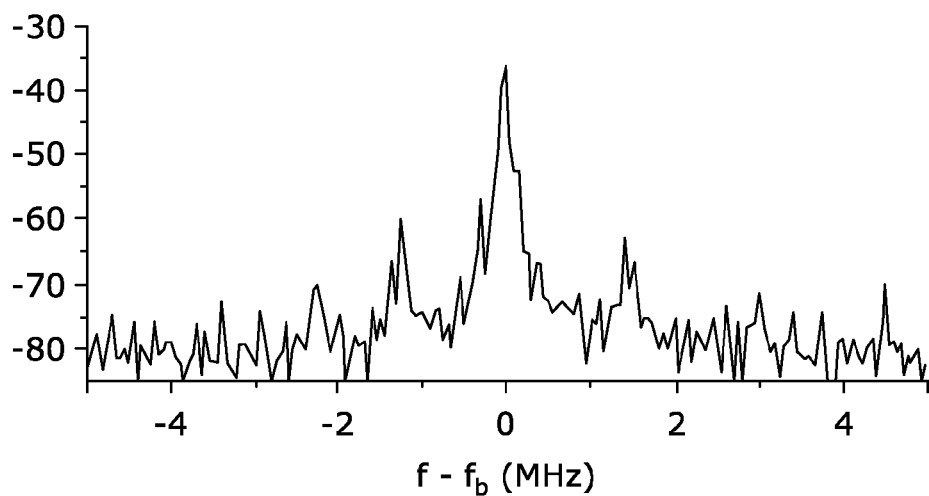
FIG. 7 contains an actual plot of the beat note between the continuum and a stabilized laser, generated from an enhanced continuum frequency comb formed as illustrated in FIG. 5.

FIG. 7 is a graph of the generated beat for an arrangement formed in accordance with the present invention, including a grating in the HNLF. As with the prior art arrangement, this graph was produced from an arrangement using a 1.2-nJ, 35-fs pulse source, centered at 1.26 μm, as measured by K. Kim, S. A. Diddams and L. Hollberg of the NIST, where the pulses were injected into a two meter section of dispersion-flattened HNLF 12. A CW laser operating at a wavelength of 657 nm was used as the combining signal. As shown, the SNR of an inventive arrangement including a Bragg grating has improved to a value of approximately 45 dB—an improvement on the order of 20 dB.

Figure 8:
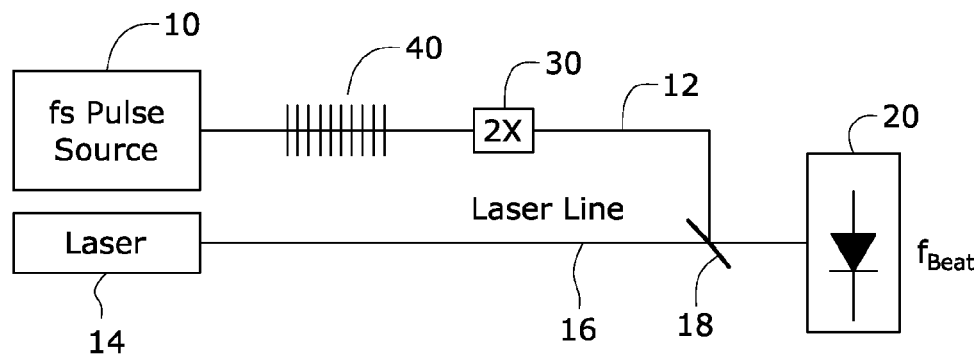
FIG. 8 illustrates an alternative embodiment of the present invention, using a frequency doubling element to shift the location of the desired comb line in order to form a high frequency beat note.
Figure 9:
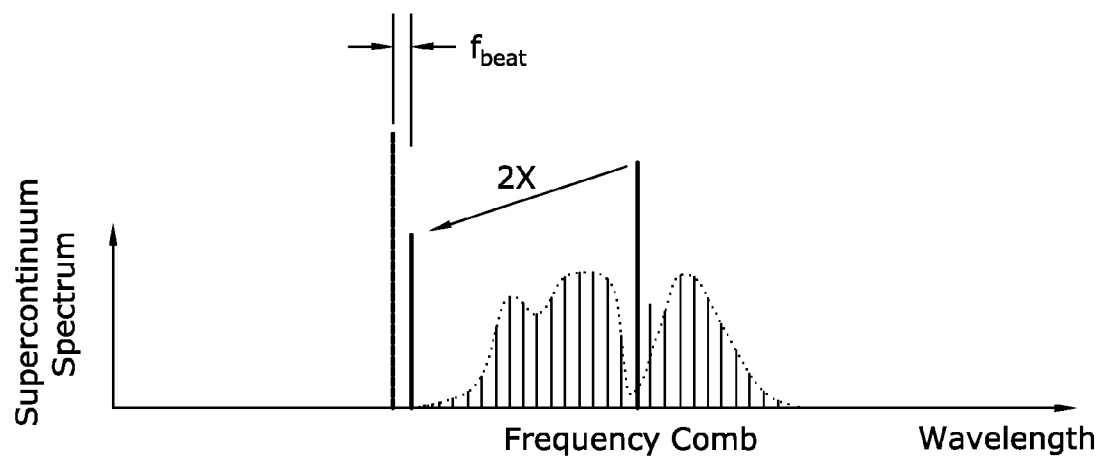
FIG. 9 is a graph illustrating the shift in beat note for the embodiment of FIG. 8.

FIG. 8 illustrates an alternative embodiment of the present invention, where a frequency converting element 30 (in this example, a frequency "doubler") is used to shift the location of the grating enhancement G, the frequency shift of the enhancement resulting in an associated shift in the location of the beat frequency. FIG. 9 contains a graph illustrating the movement of these frequencies in accordance with the arrangement of FIG. 8. Referring to FIG. 8, a frequency doubling element 30, such as a periodically-poled lithium niobate (PPLN) element, is disposed beyond grating 40 along HNLF 12 and used to frequency double the spectral components of the generated supercontinuum in the vicinity of the grating enhancement. The graph of FIG. 9 illustrates the location of the original grating enhancement G within the generated frequency comb spectrum, as well as the location of the "frequency doubled" enhancement, which will create a frequency-doubled grating-induced enhancement at a wavelength value below the frequency comb (since wavelength is inversely proportional to frequency). When combined with the laser line output from laser source 16, the beat frequency $f_{beat}$ will now be shifted downward along the spectrum, as shown in FIG. 9. In an alternative embodiment, frequency converting element 30 may comprise a "tripling" element, resulting in further movement of the beat frequency.

Figure 10:
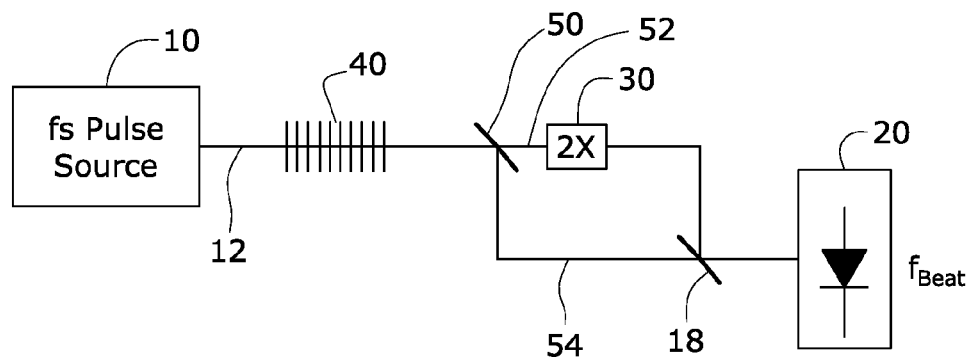
FIG. 10 illustrates a self-heterodyning embodiment of the present invention.
Figure 11:
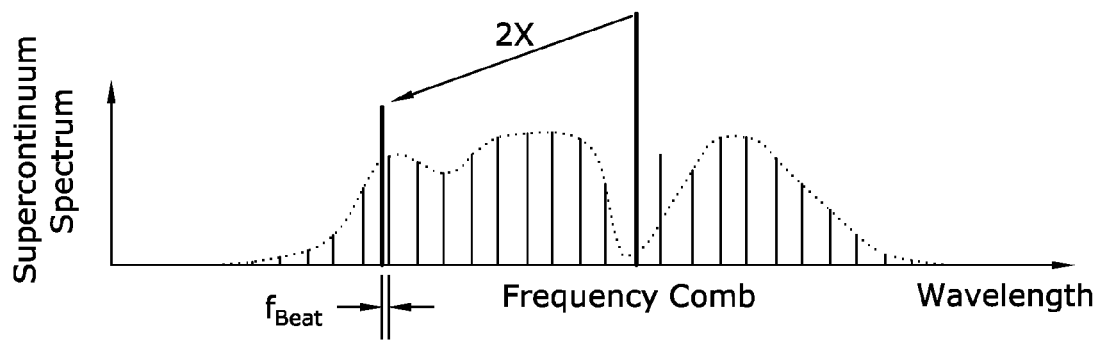
FIG. 11 contains a graph of the optical spectrum generated by the embodiment of FIG. 10.

A self-heterodyning arrangement of the present invention, as illustrated in FIG. 10, may be used to generate a beat note between frequencies "within" the comb, thus eliminating the need for an external laser line source. In this case, a beam splitter 50 (such as a conventional 50:50 optical beam splitter) is disposed along HNLF 12 at the output of grating 40. A first portion of the grating-enhanced comb signal propagates along a section 52 of HNLF and is thereafter applied as an input to frequency doubling element 30, as discussed above in association with FIGS. 8 and 9. The remaining portion of the signal from beam splitter 50 is used as the secondary laser source and is coupled into a separate section 54 of HNLF, where it is then re-combined with the frequency-doubled signal in combiner 18. It is to be noted that the use of optical combiner 18 in the form of a beam splitter/combiner component is considered to be exemplary only, and in a preferred in-line example, a section of single mode fiber may be used as combiner 18 to overlap "in time" the signals propagating at f and 2f. FIG. 11 illustrates the optical spectrum generated by this embodiment, where the "self-heterodyning" results in creating a frequency-doubled grating enhancement that is used as the beat frequency.

Figure 12:
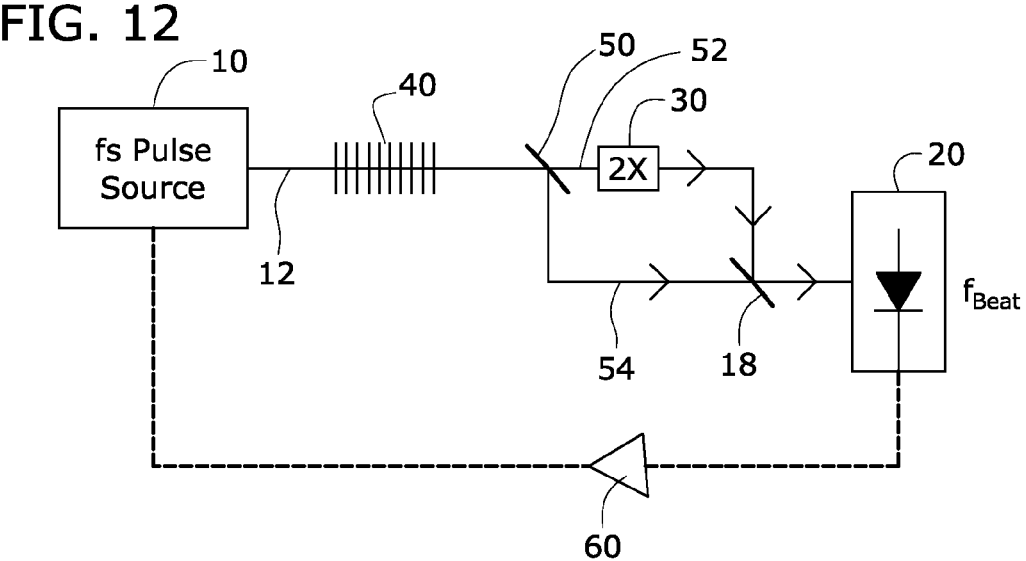
FIG. 12 illustrates an alternative arrangement of the present invention, where the generated beat note(s) is used in a feedback loop to control the stability of the generated frequency comb.
Figure 13:
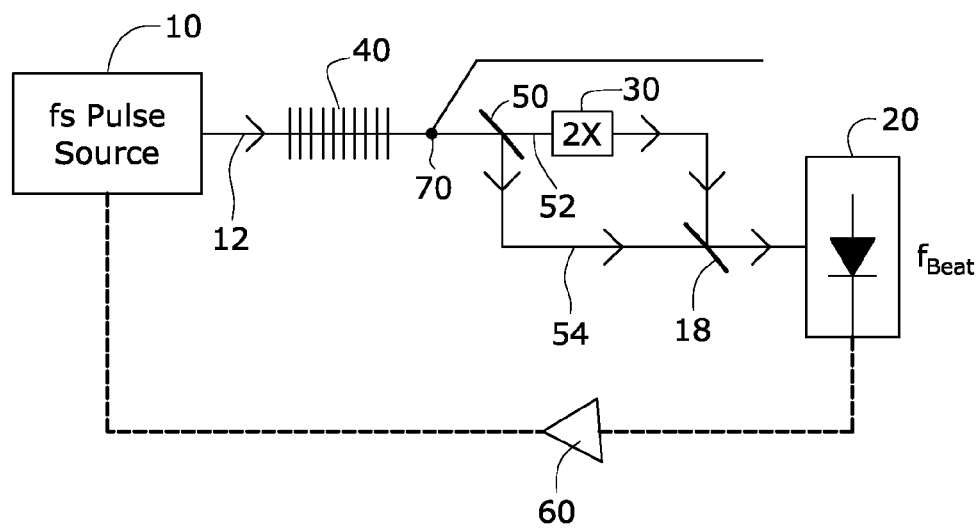
FIG. 13 is a variation of the embodiment of FIG. 12, including an optical tap at the exit of the included Bragg grating.
Figure 14:
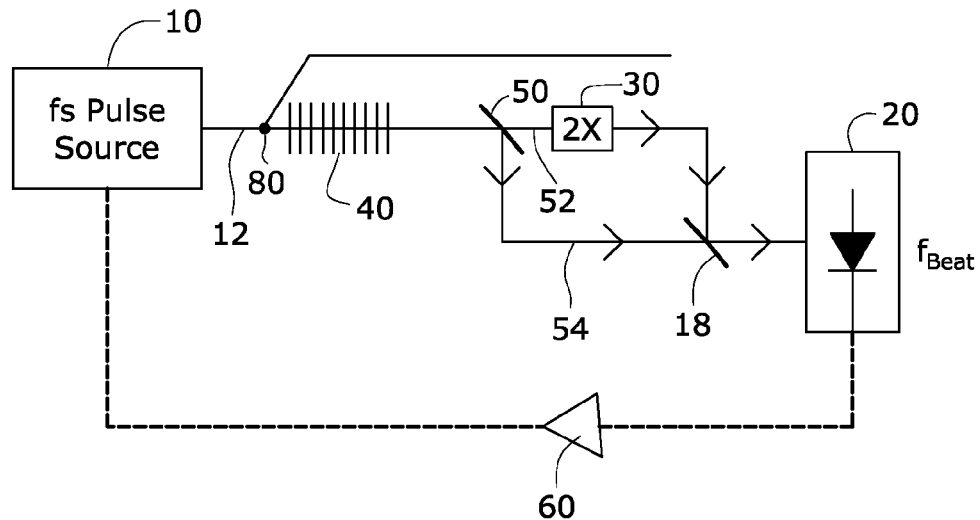
FIG. 14 is another variation of the embodiment of FIG. 12, in this case including an optical tap disposed at the entrance of the Bragg grating.

An important aspect of the present invention is the ability to monitor the beat frequency and use this information to control the pulse source so as to stabilize the generated comb. FIG. 12 illustrates a generalized feedback arrangement, denoted by element 60 coupled between optical detector 20 and fs pulse source 10. If a predetermined, unwanted "shift" in beat frequency is measured at optical detector 20, feedback element 60 uses this information to send a correction signal to pulse source 10, having source 10 adjust its output signal so as to bring the beat frequency back to the desired value. FIG. 13 illustrates a variation of the arrangement of FIG. 12, where the inclusion of an optical tap element 70 at the output of grating 40 allows for the grating-enhanced continuum to be used for other applications. FIG. 14 illustrates another variation of the arrangement of FIG. 12, in this case including an optical tap 80 disposed prior to grating 40, allowing for part of the original laser pulse to generate a continuum similar to (or the same as) the enhanced continuum signal to be used for other applications. Although not illustrated, it is to be understood that the arrangements of FIGS. 13 and 14 may be combined, allowing for both types of continuum signals to be used for other purposes. Obviously, the power associated with the tapped-off signal for any of these embodiments needs to be controlled such that a sufficient amount of power remains in the portion of the arrangement used to generate the beat frequency. Additionally, it is to be understood that the embodiments shown in FIGS. 12-14 may also be used in the manner illustrated in FIG. 8, where the feedback signal is again utilized to stabilize the output from pulse source 10.

Figure 15:
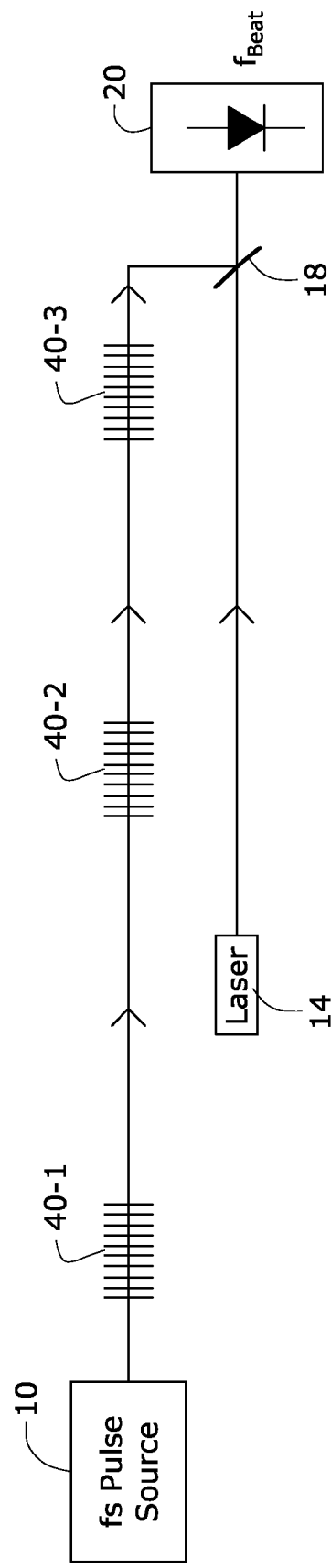
FIG. 15 illustrates yet another embodiment of the present invention, where a plurality of separate post-processed features (i.e., a plurality of separate gratings) are disposed along a section of HNLF.

FIG. 15 illustrates an alternative embodiment of the present invention, where a set of three different grating elements 40-1, 40-2 and 40-3 are disposed at separate locations along HNLF 12. The utilization of multiple post-processing enhancements results in forming a multiple number of enhanced spectral components along the associated spectral continuum, allowing for a multiple number of beat frequencies to be produced.

In an arrangement for stabilizing the carrier envelope of an optical signal, for example, a pair of grating elements (one centered at a frequency "f" and the other at "2f") are used. The frequency comb at "f" is doubled and then beat against the frequency comb at "2f" to generate a carrier offset frequency "f0". The carrier offset frequency is then locked to a stable reference near the "f0" value, thus locking the comb frequencies on a stable grid. The use of gratings at both f and 2f will improve the SNR of the beat note at f0. The addition of a third grating (at any other desired center frequency) would then function to enhance another arbitrary portion of the comb and used to compare the comb against an arbitrary external laser source. In an alternative carrier envelope stability arrangement, a pair of gratings may be used at frequencies "f" and "3f", since the inherent nonlinearity of the fiber is known to triple the value of "f" and allow for the signals at f and 3f to generate a beat note. As with the first example, a third grating may be used to combine with an arbitrary external laser source.

While these examples explicitly describe the use of multiple, separate physical gratings, a single grating may be constructed, using well-known fabrication techniques, as an "overwritten" grating where multiple gratings are incorporated within a single section of fiber (overlapped either in whole or in part), or as a "sampled" grating, which itself is capable of creating enhancements at several equally-spaced wavelengths. Additionally, the fiber grating used in accordance with the present invention may exhibit an arbitrary refractive index modulation profile, grating period and core refractive index. Such arbitrary, complex gratings may yield large, specially designed enhancement peaks for a given application.

It is to be understood that the embodiments of the present invention as described above with reference to the accompanying drawings have been given by way of example only, and that modification and additional components may be provided to enhance the performance of the frequency stabilization arrangement.

What is claimed is:

1. An arrangement for producing at least one optical beat note from a supercontinuum-generated optical frequency comb, the arrangement comprising
   a pulsed laser source;
   at least one section of highly-nonlinear optical fiber coupled to the pulsed laser source to generate a supercontinuum frequency comb, said at least one section being post-processed to exhibit at least one area of spectral enhancement within the generated supercontinuum frequency comb to create a spectrally-enhanced optical frequency comb;
   a secondary laser source; and
   an optical combiner for overlapping the output from the secondary laser source with the spectrally-enhanced optical frequency comb propagating along the highly-nonlinear optical fiber to generate the at least one optical beat note.

2. The arrangement as defined in claim 1 wherein the at least one area of spectral enhancement is configured to exhibit at least twice the power of the surrounding contiguous continuum.

3. The arrangement as defined in claim 1 wherein the section of highly-nonlinear optical fiber is post-processed to include at least one grating structure.

4. The arrangement as defined in claim 3 where the section of highly-nonlinear optical fiber includes a single grating structure exhibiting a predetermined Bragg wavelength, producing at least one spectrally enhanced peak in the generated supercontinuum within a spectral range of no more than five grating bandgaps of the Bragg wavelength.

5. The arrangement as defined in claim 4 wherein the single grating structure comprises a sampled grating structure for creating a plurality of enhanced peaks in the generated supercontinuum.

6. The arrangement as defined in claim 3 where the section of highly-nonlinear optical fiber includes a plurality of separate grating structures, each producing at least one spectrally enhanced peak in the generated supercontinuum.

7. The arrangement as defined in claim 6 wherein the plurality of separate grating structures are overwritten, at least in part, along a single section of highly-nonlinear optical fiber.

8. The arrangement as defined in claim 6 wherein at least two separate gratings of the plurality of separate gratings structures are formed in different sections of highly-nonlinear optical fiber.

9. The arrangement as defined in claim 1 wherein the section of high-nonlinear optical fiber is subjected to UV exposure during post-processing to provide enhancement of a defined wavelength range along the continuum.

10. The arrangement as defined in claim 1 where the secondary laser source comprises an external laser source, where the output of the external laser source is applied as a first input to the optical combiner and the output from the section of highly-nonlinear optical fiber is applied as a second input to the optical combiner.

11. The arrangement as defined in claim 1 where the secondary laser source comprises a CW laser source for generating an optical signal at a predetermined wavelength.

12. The arrangement as defined in claim 1 wherein the secondary laser source comprises a frequency converting element coupled between the output of the highly-nonlinear optical fiber and the optical combiner such that a frequency converted continuum signal is applied as a first input to the optical combiner and a portion of the output signal from the highly-nonlinear optical fiber is applied as a second input to the optical combiner, generating an optical beat note by overlapping the continuum with a converted version of the continuum.

13. The arrangement as defined in claim 11 wherein a frequency doubler is used as the frequency converting element.

14. The arrangement as defined in claim 13 wherein the frequency doubler comprises a periodically-poled lithium niobate (PPLN) element.

15. The arrangement as defined in claim 12 wherein the frequency converting element comprises a section of the highly-nonlinear fiber itself.

16. The arrangement as defined in claim 1 where the arrangement further comprises
an optical detector disposed at the output of the optical combiner, the detector for recognizing the presence of the generated optical beat note.

17. The arrangement as defined in claim 16 where the arrangement further comprises a feedback signal path between the optical detector and the pulsed laser source for measuring characteristics of the optical beat note and providing corrective signals to the pulsed laser source so as to generate a beat note with at least a minimum signal-to-noise ratio value and/or frequency stability at a desired operating frequency.

18. The arrangement as defined in claim 1 where the arrangement further comprises at least one optical tap at the output of the section of highly-nonlinear fiber to extract a sufficient portion of the signal for additional communication purposes.

19. The arrangement as defined in claim 1 where the arrangement further comprises at least one optical tap at the input of the section of highly-nonlinear fiber to extract a sufficient portion of the signal for communication purposes.

20. The arrangement as defined in claim 19 wherein the additional communication purposes include generating a continuum in another nonlinear element.

21. The arrangement as defined in claim 1 where the optical combiner comprises a section of single mode fiber for overlapping in time the output from the secondary laser source with the spectrally-enhanced optical frequency comb propagating along the highly-nonlinear optical fiber.

22. An arrangement for producing at least one optical beat note from a supercontinuum-generated optical frequency comb, the arrangement comprising
a pulsed laser source;
at least one section of highly-nonlinear optical fiber coupled to the pulsed laser source to generate a supercontinuum frequency comb, said at least one section being post-processed to form a single grating structure exhibiting a predetermined Bragg wavelength, producing a spectrally-enhanced optical frequency comb with at least one spectrally enhanced peak in the generated supercontinuum within a spectral range of no more than five grating bandgaps of the Bragg wavelength;
a secondary laser source;
an optical combiner for overlapping the output from the secondary laser source with the spectrally-enhanced optical frequency comb propagating along the at least one section of highly-nonlinear optical fiber to generate the at least one optical beat note; and
an optical detector disposed at the output of the optical combiner, the detector for recognizing the presence of the generated optical beat note.

* * * * *